(12) United States Patent
Lewander Xu et al.

(10) Patent No.: US 11,378,483 B2
(45) Date of Patent: Jul. 5, 2022

(54) SYSTEM AND METHOD FOR DETERMINING THE INTEGRITY OF CONTAINERS BY OPTICAL MEASUREMENT

(71) Applicants: GasPorOx AB, Lund (SE); Ishida Europe Ltd, Birmingham (GB)

(72) Inventors: Märta Lewander Xu, Lund (SE); Patrik Lundin, Harlosa (SE); Mikael Sebesta, Dalby (SE); Axel Fredrik Bohman, Oslo (NO); Lee Michael Vine, Dorset (GB)

(73) Assignees: GasPorOx AB; Ishida Europe Ltd

( * ) Notice: Subject to any disclaimer, the term of this patent is extended or adjusted under 35 U.S.C. 154(b) by 0 days.

(21) Appl. No.: 16/757,111

(22) PCT Filed: Oct. 16, 2018

(86) PCT No.: PCT/EP2018/078125
§ 371 (c)(1),
(2) Date: Apr. 17, 2020

(87) PCT Pub. No.: WO2019/076838
PCT Pub. Date: Apr. 25, 2019

(65) Prior Publication Data
US 2020/0249117 A1 Aug. 6, 2020

(30) Foreign Application Priority Data
Oct. 18, 2017 (SE) .................................... 1751293-0

(51) Int. Cl.
*G01N 21/00* (2006.01)
*G01M 3/38* (2006.01)
(Continued)

(52) U.S. Cl.
CPC .......... *G01M 3/38* (2013.01); *G01N 21/3504* (2013.01); *G01N 21/59* (2013.01); *G01N 2021/1795* (2013.01); *G01N 2021/399* (2013.01)

(58) Field of Classification Search
CPC .. G01N 21/39; G01N 21/3504; G01N 21/031; G01N 2021/399; G01J 3/42
(Continued)

(56) References Cited

U.S. PATENT DOCUMENTS

2004/0134840 A1* 7/2004 Salmi .................... G01M 3/363
209/599
2009/0220303 A1* 9/2009 Dickinson, III ...... E21B 43/305
405/55
(Continued)

FOREIGN PATENT DOCUMENTS

CN         106872402 A    6/2017
EP         1333267 A1     8/2003
(Continued)

OTHER PUBLICATIONS

Search Report and Written Opinion for International Application No. PCT/EP2018/078125 dated Jan. 15, 2019, in 10 pages.
(Continued)

*Primary Examiner* — Md M Rahman
(74) *Attorney, Agent, or Firm* — Knobbe Martens Olson and Bear, LLP (57) ABSTRACT

A method or system of determining integrity of a closed container comprising at least one gas. The determination is based on applying a mechanical force to at least one side of the container and transmitting a light signal across at least a portion of an outside surface of at least one side of the container using an optical sensor. The optical sensor is sensitive to the at least one gas inside the container. Detect-
(Continued)

ing a transmitted light signal and determining, based on the detected light signal, if the at least one gas inside the container has been detected outside of the container.

20 Claims, 7 Drawing Sheets

(51) Int. Cl.
*G01N 21/3504* (2014.01)
*G01N 21/59* (2006.01)
*G01N 21/17* (2006.01)
*G01N 21/39* (2006.01)

(58) Field of Classification Search
USPC .......................................................... 356/438
See application file for complete search history.

(56) References Cited

U.S. PATENT DOCUMENTS

| | | | | |
|---|---|---|---|---|
| 2012/0292813 | A1* | 11/2012 | Middleton | B29C 45/14336 264/255 |
| 2014/0160479 | A1 | 6/2014 | Hager et al. | |
| 2016/0020067 | A1* | 1/2016 | Iwasawa | H01J 37/22 250/440.11 |
| 2018/0095000 | A1* | 4/2018 | Lundin | G01M 3/38 |
| 2018/0141090 | A1* | 5/2018 | Ando | C08J 11/20 |
| 2018/0154480 | A1* | 6/2018 | Bai | B33Y 30/00 |
| 2018/0188164 | A1* | 7/2018 | Xu | G01N 21/0303 |
| 2018/0304344 | A1* | 10/2018 | Kellermann | B21H 7/00 |

FOREIGN PATENT DOCUMENTS

| | | |
|---|---|---|
| EP | 2990780 A1 | 3/2016 |
| FR | 2747779 A1 | 10/1997 |
| GB | 2549985 A | 11/2017 |
| JP | 2004-010108 A | 1/2004 |
| JP | 2011-179975 A | 6/2008 |
| WO | WO 2008/068452 A1 | 6/2008 |
| WO | WO 2012/125108 A1 | 9/2012 |
| WO | WO 2017/191465 A2 | 11/2017 |

OTHER PUBLICATIONS

Office Action received in European Application No. 18788745.0, dated Feb. 10, 2021.

* cited by examiner

SYSTEM AND METHOD FOR DETERMINING THE INTEGRITY OF CONTAINERS BY OPTICAL MEASUREMENT

CROSS-REFERENCE TO RELATED APPLICATIONS

This application is the U.S. National Phase under 35 U.S.C. § 371 of International Application No. PCT/EP2018/078125, filed Oct. 16, 2018 entitled "SYSTEM AND METHOD FOR DETERMINING THE INTEGRITY OF CONTAINERS BY OPTICAL MEASUREMENT", which claims priority to Swedish Patent Application No. 1751293-0, filed on Oct. 18, 2017, entitled "SYSTEM AND METHOD FOR DETERMINING THE INTEGRITY OF CONTAINERS BY OPTICAL MEASUREMENT".

BACKGROUND OF THE INVENTION

Field of the Invention

This disclosure pertains to determining the integrity of closed containers by performing optical measurements across an outside surface of the container for detection of gas leakage from inside the container. The measurements include exercising a mechanical force on the container and performing optical measurements across an outside surface of the container for detection of gas leakage from inside the container. Especially, the disclosure relates to non-destructive leak testing of containers such as packages, bags, trays.

Description of the Prior Art

Verification of the integrity of sealed containers is important in many industrial settings. Examples include quality control of packaging of products such as food and pharmaceuticals. The integrity of sealed containers may be compromised e.g. by deficiencies in the sealing process, or in the barrier materials, or due to damage during the production process or handling. Integrity is important for several reasons, e.g., to keep the contents of the package inside the container; to keep any pre-filled gas composition inside the container at desired levels; and to keep outside atmospheric gases from entering the container. The last two points may be of great importance to prevent degradation of the contents of the container. For example, the level of oxygen or water vapour (moist) often determines the shelf life of the product. Other motivations for detecting leaks in containers are to verify the integrity of the container to substances other than gas, e.g., including but not limited to water, liquids, bacteria, viruses and other biological agents. By using gas-based leak detection, a measure of the size of a leak or a guarantee of an intact package can be obtained, which is relevant to the integrity against these other substances.

Several means to verify the integrity of containers are known in the art. For example, flexible containers may be subjected to mechanical force to check the resistance of the pressure of the gas inside. However, this method is typically not suitable for detection of small leaks, and also carries the risk of damaging the container. Some types of containers can be inspected by automated vision systems to detect anomalies, but again this may not detect small leaks, and the method is limited to certain kinds of containers. Small leaks can be detected by penetration tests using dyes or trace gases such as helium, but such tests are often destructive. Another method is to subject the container to external variations in the outside atmosphere, e.g., by placing it in a (partial) vacuum chamber, or exerting overpressure on the container with atmospheric air or other gases, or combinations of these techniques. With this method, some additional means to detect a leak of a container is required, i.e., by controlling or measuring one or more parameters that may change as consequence of the variation in outside pressure or gas composition, if a leak is present. Several such techniques are known in the art. For example, transient pressure variation in the chamber may be recorded, and its behaviour may be indicative of a leak in the sample. As another example, if the container contains a gas species that is not present in normal air at significant concentrations, a gas detector may be placed in the test chamber (or at the outlet) to detect the presence of that gas species, indicating a leak.

Non-intrusive optical detection of gases inside packages for quality control is disclosed in patent EP 10720151.9 (Svanberg et al.). The principle of optical detection of the gas in the headspace of packages for the purpose of indicating leaks is known in the art. This method is based on that the gas inside the package may deviate from an assumed gas composition due to interaction with the surrounding atmosphere through the leak. However, in normal atmosphere, for small leaks, it may take a very long time before there is a detectable deviation of the gas composition inside a package, which makes the method impractical in many situations.

A faster determination of container integrity, based on optical measurements of the gas composition/pressure inside a sealed container, is covered by WO 2016/156622. Here the container is subjected to a surrounding with a forced change in gas concentration/pressure, thereby inducing a faster change inside the container if a leak is present, compared to the natural alternations observed in EP 10720151.9.

Another method is to use a gas detection cell to which leaked gas is extracted and detected. Drawbacks with this method is, for example, time for detection, complexity of the system, costly, the gas is diluted, and large volume of leaked gas is required to be able to detect a leakage.

There are situations where none of the methods previously described in the art are suitable for detecting a leak. One such example is for inline measurements, hence new improved apparatus and methods for detecting leaks in such containers would be advantageous.

SUMMARY OF THE DISCLOSURE

Accordingly, embodiments of the present disclosure preferably seek to mitigate, alleviate or eliminate one or more deficiencies, disadvantages or issues in the art, such as the above-identified, singly or in any combination by providing a system or method according to the appended patent claims for non-destructively determining the integrity of sealed containers by transmitting light over an outer surface of at least one side of the container.

In one aspect of the disclosure, a method of determining integrity of a closed container including at least one gas is described. The method may include applying a mechanical force to at least one side of the container and transmitting a light signal across at least a portion of an outside surface of at least one side of the container using an optical sensor. The optical sensor may be sensitive to the least one gas inside the container.

The method may further include detecting a transmitted light signal, and determining, based on the transmitted light signal being detected, if a level of the at least one gas inside the container has changed outside of the container.

In some examples of the method may the optical sensor be a light source and a detector. The light may be transmitted between the light source and the detector and the detected light signal may be an absorption signal, such as Tunable diode laser absorption spectroscopy signal.

Some examples of the method includes that the force may be applied by a deformation member, such as a roller or a glider.

In some examples of the method may the container be a MAP food package, such as a bag or a tray.

In some examples may the method include determining an integrity of the container in-line, such as at a convey belt.

Some example of the method may include flushing a surrounding of the container with a neutral gas, such as with nitrogen (N2), between or during transmittal of the light signal.

In some examples of the disclosed method may the measured gas be carbon dioxide (CO2).

Some examples of the method may include injecting a gas to create a flow around the package for transporting the leakage gas to the light signal.

A further aspect of the disclosure a system for determining integrity of a sealed container including at least one gas is described. The system may include a member, or device, for applying a mechanical force to at least one side of the container, and an optical sensor sensitive to the at least one gas. The sensor may be configured for transmitting a light signal across at least a portion of an outside surface of at least one side of the container.

The system may further include a control unit for determining, based on the detected transmitted light signal, if a level of the at least one gas inside the container has changed outside of the container.

In some examples of the disclosed system may the member be a deformation member, such as a roller or a glider.

In some examples of the disclosed system may an extractor or suction member, such as holes connected to a pump, or a fan, be arranged close to the sensor for increasing a concentration of the at least on gas adjacent the optical sensor.

In some examples of the disclosed system may a roof be arranged over the sensor for increasing a concentration of the at least on gas adjacent the optical sensor.

Some examples of the disclosed system may include more than one sensor arranged at different sides of the container.

In some examples of the disclosed system may the light be folded using optics, such as mirrors, to pass multiply times across a surface of the container.

In some examples of the disclosed system may the light be folded using optics, such as mirrors, to pass over more than one surface of the container.

In some examples of the disclosed system may the measured gas be carbon dioxide (CO2).

Some examples of the disclosed system may include a device configured for injecting a gas in order to create a flow around the package for transporting the leakage gas to the light signal.

Some advantages of the disclosed systems and methods compared to known systems and methods, may be that the disclosed systems and methods could be less complex than known systems and methods as it requires fewer parts and/or steps in the detection process. The response for detecting the leakage may be improved and the signal from the detected gas may be increased which may improve the sensitivity of the leakage detection.

The sensor arrangements described may also be used to detect where the leakage is located on the package.

The disclosed methods and systems may also be affected by ambient gases and the surrounding environment.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

These and other aspects, features and advantages of which examples of the disclosure are capable of will be apparent and elucidated from the following description of examples of the present disclosure, reference being made to the accompanying drawings, in which.

DESCRIPTION OF EXAMPLES

Specific examples of the disclosure will now be described with reference to the accompanying drawings. This disclosure may, however, be embodied in many different forms and should not be construed as limited to the examples set forth herein; rather, these examples are provided so that this disclosure will be thorough and complete, and will fully convey the scope of the disclosure to those skilled in the art.

The following disclosure focuses on examples of the present disclosure applicable to determining the integrity of containers by performing optical measurements across an outside surface of the container for detection of gas leakage from inside the container. The measurements may include exercising a mechanical force on the container and performing optical measurements across an outside surface of the container for detection of gas leakage from inside the container. The disclosure relates to non-destructive leak testing of closed containers such as packages, bags, trays etc. For example, the disclosed systems and methods can be used to improve the detection of leaks from a closed package or container. However, it will be appreciated by the person skilled in the art that the description is not limited to this application but may be applied to many other systems where the integrity of closed containers needs to be determined.

A container may be a closed bag or closed tray that includes at least one species of a gas, Examples may be containers having a modified atmosphere (MAP). Modified atmosphere is commonly used in packages in order to improve the shelf life, for example in food packages, drugs, etc. gases commonly used are carbon dioxide (CO2) or nitrogen (N2) to lower the amount of oxygen (O2). This is made in order to slow down growth of aerobic organisms and prevent oxidation reactions. Hence it is important to monitor these packages and make sure that there is no leakage, for example during packaging. Apart from carbon dioxide (CO2), and oxygen (O2), other gases can be monitored as well, depending on the container and the product.

Figure 1:
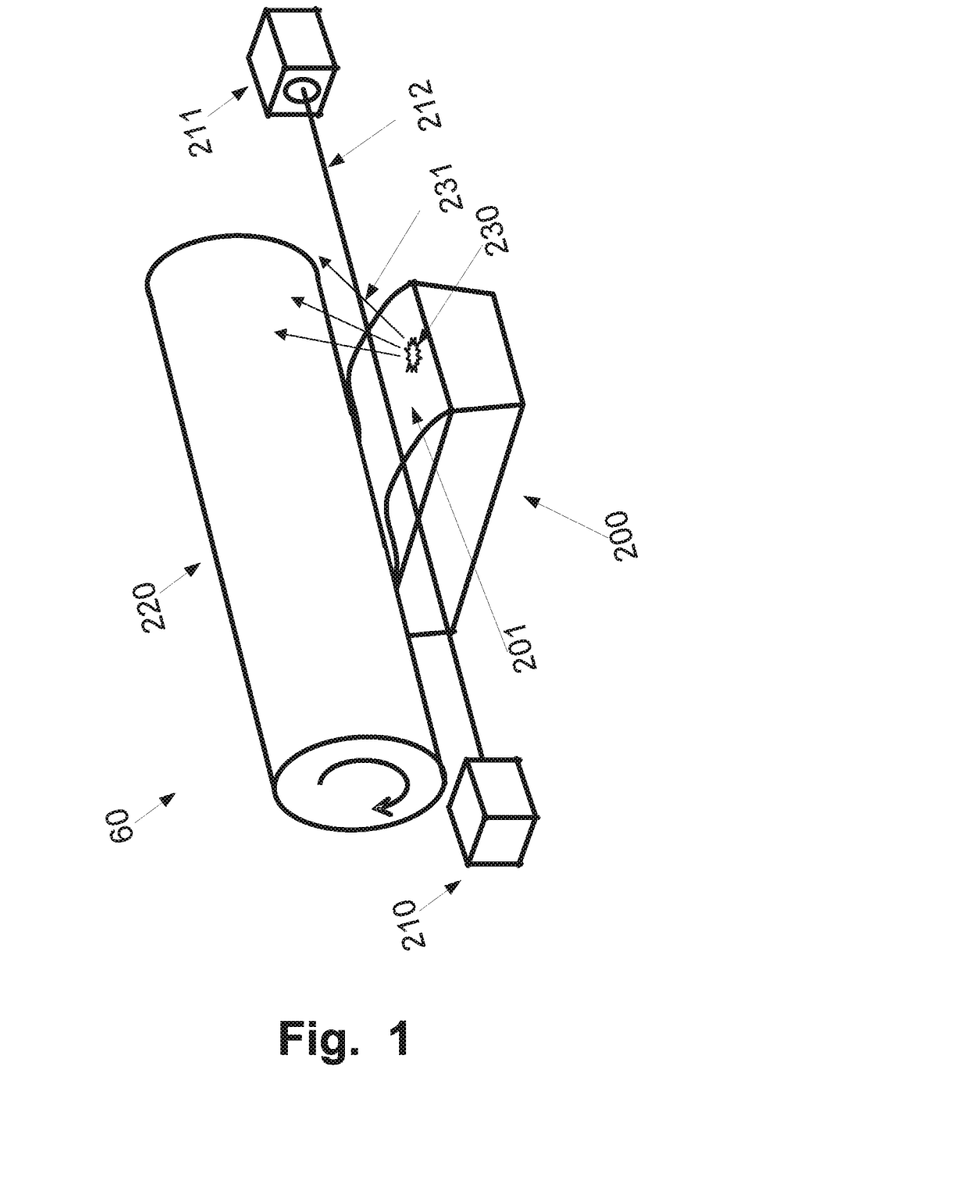
FIG. 1 is illustrating an example of an arrangement where a roller for applying a force to at least one side of a container.

FIG. 1 is illustrating a schematic example of an implementation 60 of an optical sensor according to any of FIGS. 3A to 3F. In the illustration, the light source 210 transmits a light signal 212 to the detector 211 across over an outer surface 201, such as a top surface, of the container 200.

In these examples a mechanical member, or device, 220, such as a deformation tool, is used to apply a force on at least one side of a container 200. The applied force may deform the container 200 to some extent. The deformation of the container 200 may force gas 231 inside the container 200 to leak out through any holes or crack 230 that may exist. The amount of gas 231 that may leak out from any holes or cracks 230 may be larger when using a mechanical member 220 than what may spontaneously leak out. Thereby improving the chances of detecting or receive an indication that there is a leakage from the container 200 due to a hole, crack, a bad welded or glued seal or seam, breach of package seal, by contamination of a foreign body, which may be the contents or part of contents of the package.

In the illustration, a roller 220 is used to apply a force on the top side 201 of the container 200. A roller 220 makes it easy for the container 200 to pass under or for the mechanical member 220 to move over the container 200. Alternative, the mechanical member 220 may be a glider, such as a beam or a plate, treated to have low friction against the container 200.

Alternatively, in some examples, the mechanical member 220 may be temporarily pushing a side 2001 of the container 200 during the measurement. The pushing may be done in an oscillating manner while the container 200 moves, for example, along a convey belt.

Alternatively, in some examples, instead of using a mechanical member 220, a jet stream of gas, such as air, may be used to apply a force on a side 201 of the container 200.

Figure 2A:
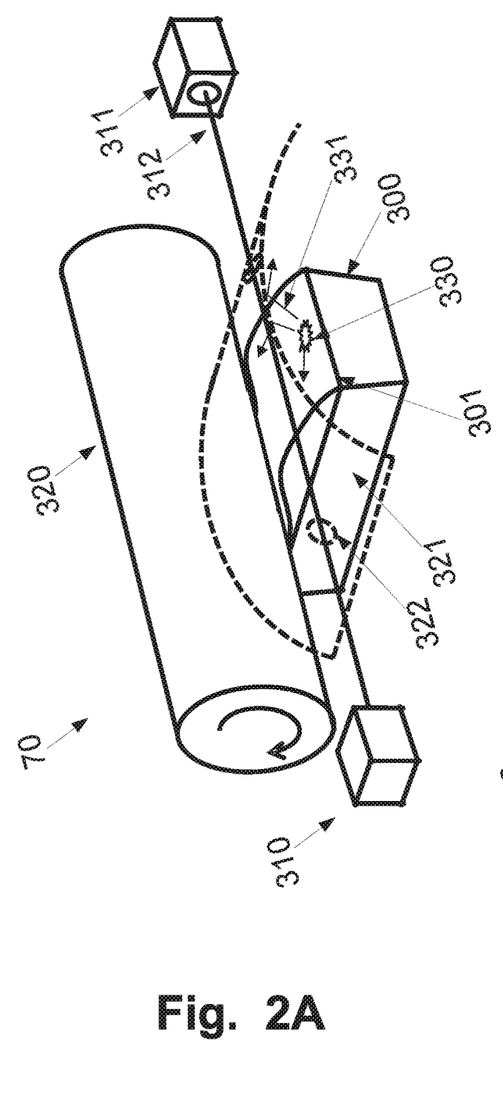
FIGS. 2A and 2B are illustrating exemplary arrangement of a roof for increasing a concentration of leaked gas close to an optical sensor.
Figure 2B:
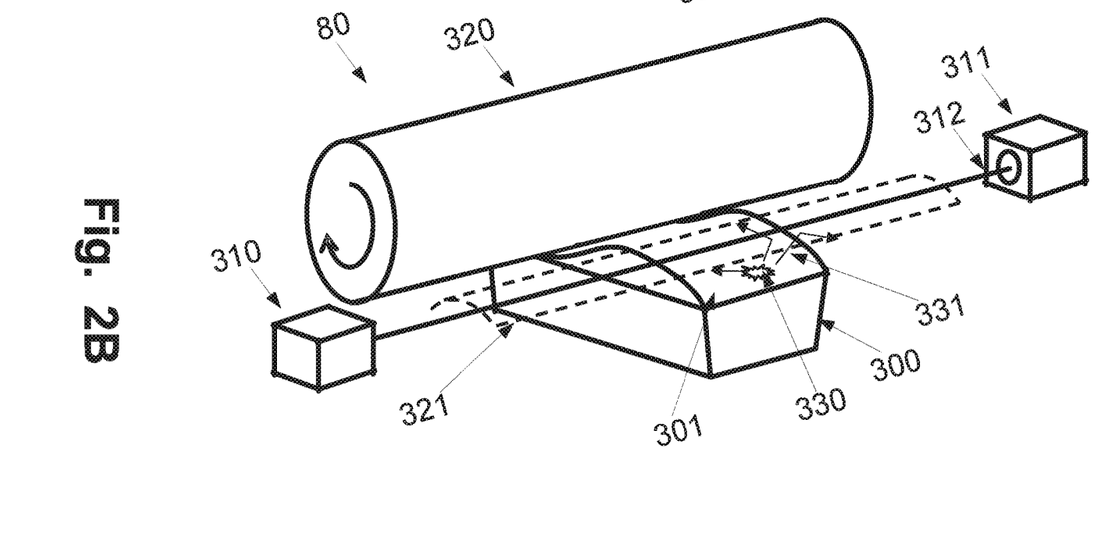

Alternatively, instead of pushing on the top side 201 of the container 200, as illustrated in FIGS. 1, 2A and 2B, the force may be applied on any side or sides of the container 200.

The force applied on a side of the container either by a mechanical member, such as a roller, a glider or a pusher, or by a jet stream of gas will temporarily deform the container forcing the inside gas out through any holes that may exist. This may increase the concentration of the leaked gas outside of the container thereby increasing the signal which may improving the sensitivity of the system thereby improving the detection rate of leaks from smaller holes than would otherwise be possible to detect.

In the schematic example illustrated in FIG. 1, the container 200 may be moving in relation to the sensor and the mechanical member 220 used for deforming the container 200. The container 200 may for example be moved by a convey belt. Alternatively, the container 200 is fixed while the mechanical member 220 and the sensor move in relation to the container 200.

Additionally, and/or alternatively, in some example, an extractor member or suction member (not shown) may be arranged adjacent the laser beam 212 of the sensor. In some examples, the extractor member or suction member may be arranged adjacent both the laser beam 212 and the mechanical member 220 used for deforming the container 200.

The extractor member or suction member may be used for increasing the concentration of leaked gases 231 from the container 200 close to the sensor thereby increasing the signal which may lead to improvement of the sensitivity of the system. The improved sensitivity makes it possible to detect smaller hole or cracks 230, but also make the detection faster.

The extractor member or suction member may be made from, for example, a beam or tube having a lumen and holes arranged along a side directed towards the container 200. The lumen may be connected to a pump, a fan or an extractor and when in use, the pump, a fan or an extractor will suck air through the holes. Any leaked gas 231 from holes or cracks 230 in the container 200 will be drawn towards the extractor or suction member increasing the concentration of the leaked gas in the beam path of the sensor thereby increase the signal.

FIGS. 2A and 2B are illustrating two different schematic examples of implementations 70, 80 for further improving the detection rate and the sensitivity of the system. The improvements are archived by adding a roof, screen, cap or dome 321 over the light beam 312 transmitted between the light source 310 and the detector 311. The roof, screen, cap or dome 321 may increase the concentration of the leaked gas 331 from a hole of crack 330 adjacent the light beam 312, thereby increase the detected signal.

Additionally, in some examples, the roof, screen, cap or dome 321 may be used together with a mechanical member, or device, 320 used for applying a force on a side 301 of the container 300.

The example illustrated in FIG. 2A, the roof, screen, cap or dome 321 is arranged to cover the whole side 301 of the container 300. To allow the light beam 312 to be transmitted across the outer surface 301 of the container 300, the roof, screen, cap or dome 321 may be provided with holes 322.

The example illustrated in FIG. 2B, the roof, screen, cap or dome 321 is arranged locally over the light beam.

Figure 3A:
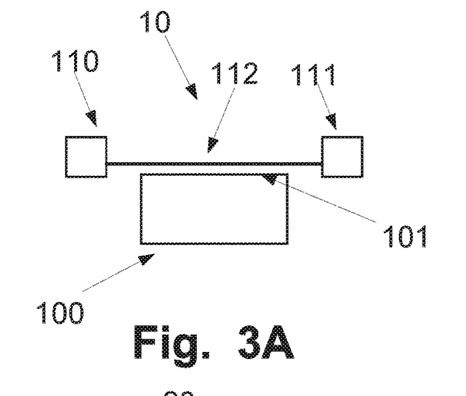
FIGS. 3A to 3F are illustrating exemplary arrangements of an optical sensor to be used in a system while applying a mechanical force.
Figure 3B:
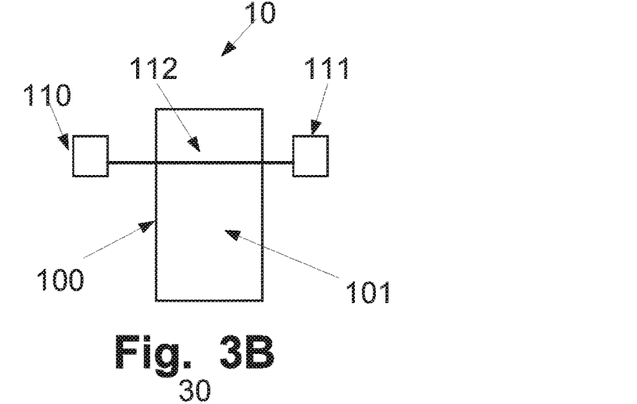

The roof, screen, or cap 321 may have any suitable shape, apart from the curved shapes illustrated in FIGS. 3A and 3B, the roof, screen, or cap 321 may be, for example, dome shaped or flat.

The implementation of the arrangements as illustrated in FIGS. 1, 2A and 2B may be done off-line or in-line while the packages are moving along a convey belt. The implementation may, in some examples, be that the sensor is moving in relation to the container instead of the container moving in relation to the sensor.

Additionally, in some examples, a surrounding of the container may be flushed with a neutral gas, such as with nitrogen (N2), between or during transmittal of the light signal. When flushing the neutral gas between measurements, the surrounding may be cleaned from any gas that may interfere with the measurements. Hence the sensitivity may increase.

When applying a neutral gas to the surrounding of the container during the measurements, such as flushing of having a constant flow, the background of the measurement will be low. Hence the leaked gas may be easier to detected, thereby increasing the sensitivity.

In the illustrated examples, absorption is measured to determining if there is a leakage from the container. An alternative may be to use an optical sensor based on laser induced fluorescence where the detected light signal is a disperse spectra or an excitation spectra. The arrangement may be similar but the light source may be a pulsed laser ending in a beam blocker while the detector is moved to detect the fluorescence signal. An alternative arrangement may be planar laser-induced fluorescence where optics is used to form the laser beam into a plane which may cover a whole side of the container.

FIGS. 3A to 3F are illustrating exemplary arrangements of an optical sensor to be used in a system or method while applying a mechanical force.

FIG. 3A is illustrating a schematic exemplary arrangement 10 of an optical sensor for determining if there is a leakage from a closed container 100.

The optical sensor includes a light source 110, such as a laser and a detector 111. The light source may be a white light source or at least one laser source, such as a diode laser, a semiconductor laser. The wavelengths or wavelength range used for the light source is selected to match the absorption spectra of at least one species of the gas inside the container 100. The detector 111 may be, for example, a photodiode, a photomultiplier, a CCD detector, a CMOS detector, a, InGaAs detector, selected to be able to detect the wavelengths or wavelength range of the light source 110.

The light source 110 transmits a light signal 112 at least across a portion of an outer surface 101 of a side of the container 100. The light signal 112 is transmitted above the outer surface 101, such as adjacent the outer surface 101 or at a distance above the outer surface 101. The light signal 112 may be transmitted from side to side across the outer surface 101, such as transverse, or at an angle, such as diagonally or along. The optical sensor may transmit the light signal 112 above the container 100, along a side of the container, or under the container.

FIG. 3B is illustrating the schematic arrangement 10 of the optical sensor in FIG. 3A from another angle.

Alternatively, for the arrangements illustrated in FIGS. 3A and 3B, the light source 110 and the detector 111 may be arranged at the same side and the light may be transmitted twice across the outer surface 101 by having the light signal 112 reflected in a reflecting element, such as a mirror, arranged opposite the light source 110 and the detector 111.

Figure 3C:
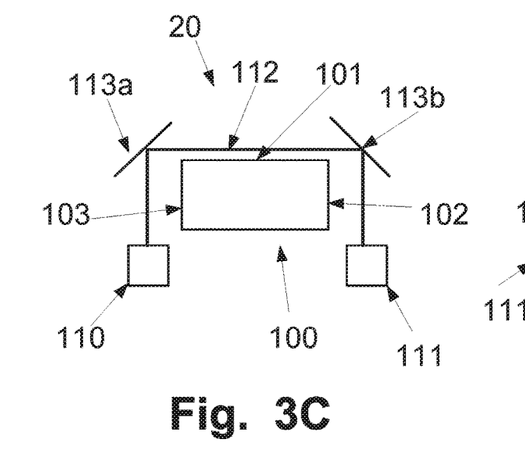
Figure 3D:
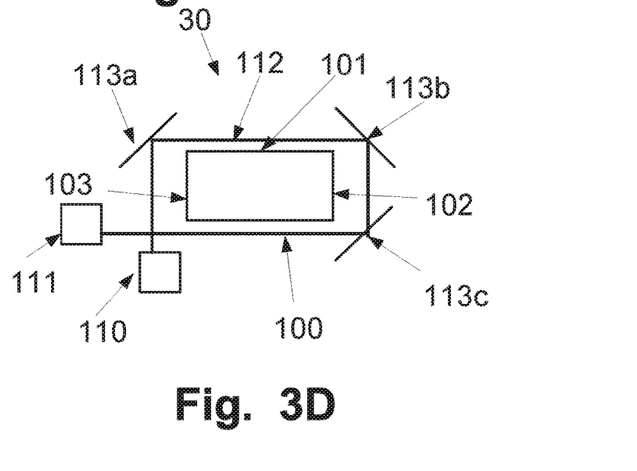

FIG. 3C is illustrating a further schematic arrangement, 20, of the optical sensor. In this example, the light signal 112 is transmitted from a light source 110 to a detector 111 across three outer surfaces 101, 102, 103 of three sides of a container 100. The light signal 112 is, in this example folded by reflective elements 113a, 113b, such as mirrors. By only using one reflective element 113a, 113b the light signal 112 may be transmitted across two outer surfaces instead of three as illustrated. Alternatively, as illustrated in FIG. 3D, in the further arrangement 30, of the optical sensor, by adding a third reflective member, 113c, the light signal 112 may be transmitted across four outer surfaces of the container 100.

Additionally, and/or alternatively, in some examples, by using different optical elements, such as mirrors, beam splitters and prisms, the light signal 112 may be transmitted across further outer surfaces of the container 100. This may also include the use of further detectors.

Figure 3E:
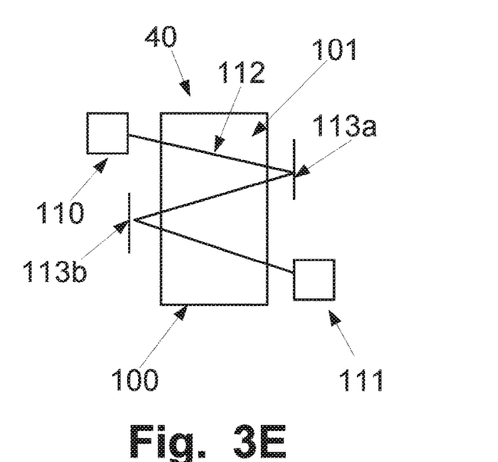

FIG. 3E is illustrating a further schematic arrangement 40 of an optical sensor wherein a light signal 112 is transmitted from the light source 110 to the detector 111. The light signal 112 is, in the illustrated example, folded using two reflective elements 113a, 113b to have the beam reflected across an outer surface 110 of the container 100. Other arrangements are possible wherein only one reflective element 113a is used to have the light signal 112 to be transmitted across the outer surface 101 twice.

Alternatively more than two reflective elements 113a, 113b may be used to have the light transmitted across the outer surface 101 more than three times.

Figure 3F:
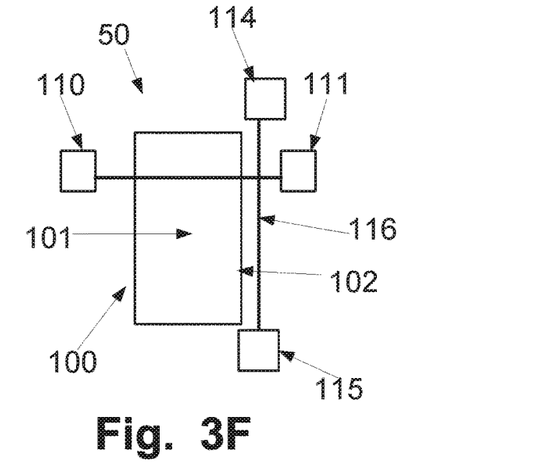

FIG. 3F is illustrating a schematic example of an arrangement 50, where two sensors are used to cover two outer surfaces of a container 100. The first optical sensor includes light source 110 transmitting a light signal 112 across a first outer surface 101 of container 100. The second optical sensor includes the light source 114 and detector 111 transmitting a light signal 116 across a second outer surface 102 of container 100. Additional optical sensors may be used to cover further outer surfaces of the container 100.

In the examples given in FIGS. 3A to 3F, the measurements are based on absorption spectroscopy, such as Tunable diode laser absorption spectroscopy. If a change in the gas signal is detected matching at least one species of a gas inside the container, the container is considered to be leaking, given by a certain threshold. The leak could be due to a hole, crack, a bad welded or glued seal or seam, such as foil against the edge of a tray or an opening of a bag. If the species inside the container is present in the ambient background, such as carbon dioxide ($CO_2$), an increase in the absorption peak of $CO_2$ compared to the background may indicate that the container is leaking.

Figure 4:
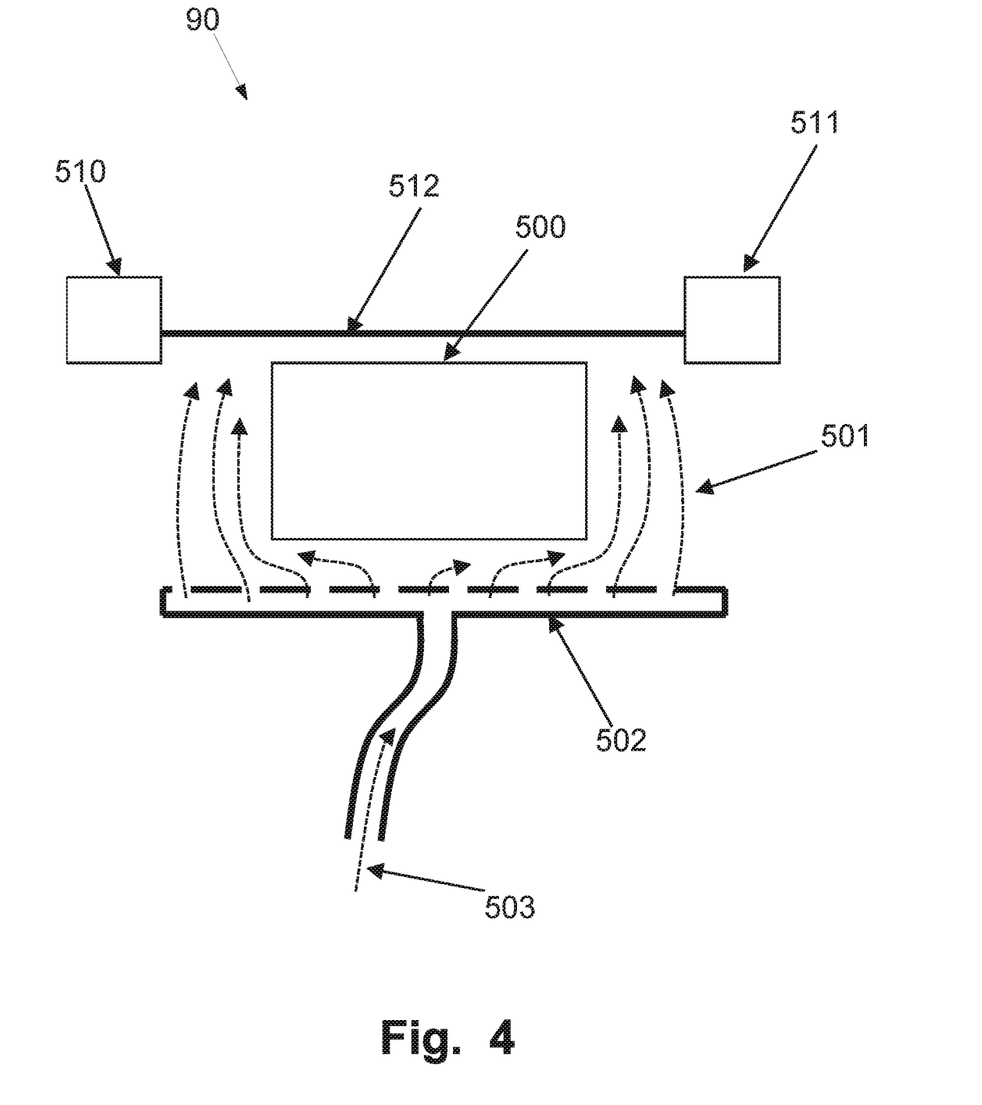
FIG. 4 is illustrating an exemplary arrangement where a gas flow may be added from below the package.

FIG. 4 is illustrating a schematic example of an arrangement 90, where an additional flow of gas 501, for example air or nitrogen, is injected in order to increase the gas transport from a leakage position on a package 500, to a light beam 512 transmitted between the light source 510 and the detector 511. In this example, the light beam 512 may pass above the package. Alternatively, any of the configurations as described in relation to FIGS. 3A to 3F may be used. If the leakage, for example, is on the bottom side of the package 500 it may be beneficial to inject a gas flow 501 from below to help the leakage gas reach to the light beam 512. The injected gas stream 501 may create a flow, which may be laminar or turbulent or a mixture between, across the surface of the package 500 toward and through the light beam 512. The gas injection is in this example figure made through a device 502 with a number of small holes across the surface, which functions as outlets. The device may be connected to a gas inlet 503. The gas injection may also be done in other ways, for example through a single eject nozzle, or a porous material. The gas injection may also occur on any other side of the package.

The advantage of this arrangement 90, is to help transmitting the leakage gas to the light beam 501. This may increase the signal related to the leakage gas.

The arrangement 90 illustrated in FIG. 4 may be used together with a member or device for applying a mechanical force on the package 500, as described in relation to FIGS. 1, 2A, and 2B.

The systems disclosed herein may further include a control unit for determining if a level of at least one gas inside the container has changed outside of the container based on a detected transmitted light signal. All determinations or calculations described herein may be performed by a control unit or a data processing device (not illustrated) connected to the detector. The control unit may be a data processing device, and may be implemented by special-purpose software (or firmware) run on one or more general-purpose or special-purpose computing devices. In this context, it is to be understood that each "element" or "means" of such a computing device refers to a conceptual equivalent of a method step; there is not always a one-to-one correspondence between elements/means and particular pieces of hardware or software routines. One piece of hardware sometimes comprises different means/elements. For example, a processing unit serves as one element/means when executing one instruction, but serves as another element/means when executing another instruction. In addition, one element/means may be implemented by one instruction in some cases, but by a plurality of instructions in some other cases. Such a software controlled computing device may include one or more processing units, e.g. a CPU ("Central Processing Unit"), a DSP ("Digital Signal Processor"), an ASIC ("Application-Specific Integrated Circuit"), discrete analog and/or digital components, or some other programmable logical device, such as an FPGA ("Field Programmable Gate Array"). The data processing device 10 may further include a system memory and a system bus that couples various system components including the system memory to the processing unit. The system bus may be any of several types of bus structures including a memory bus or memory controller, a peripheral bus, and a local bus using any of a variety of bus architectures. The system memory may include computer storage media in the form of volatile and/or non-volatile memory such as read only memory (ROM), random access memory (RAM) and flash memory. The special-purpose software may be stored in the system memory, or on other removable/non-removable volatile/non-volatile computer storage media which is included in or accessible to the computing device, such as magnetic media, optical media, flash memory cards, digital tape, solid state RAM, solid state ROM, etc. The data processing device 10 may include one or more communication interfaces, such as a serial interface, a parallel interface, a USB interface, a wireless interface, a network adapter, etc., as well as one or more data acquisition devices, such as an A/D converter. The special-purpose software may be provided to the control unit or data processing device on any suitable computer-readable medium, including a record medium and a read-only memory.

Figure 5:
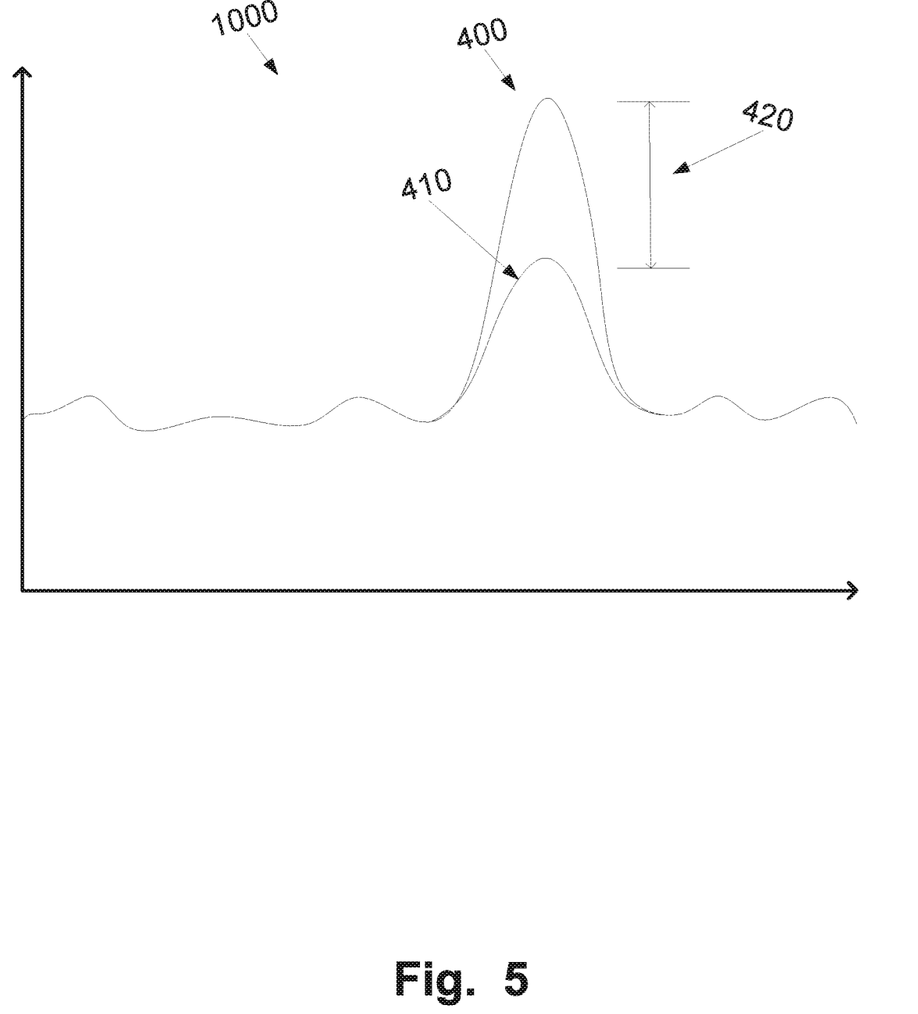
FIG. 5 is illustrating a schematic diagram over a measurement.

FIG. 5 is illustrating a schematic diagram over a measurement 1000. The diagram shows two curves, one with a leakage 400, and one being the background 410 or a container without a leakage. The increased amplitude of the absorption peak 410 indicates that there is a leakage.

Additionally, in some examples, by calculating the difference 420 between the background 410 and the peak 400 indicating a leak, the size of the leak may be estimated, such as the size of the hole or crack.

Figure 6:
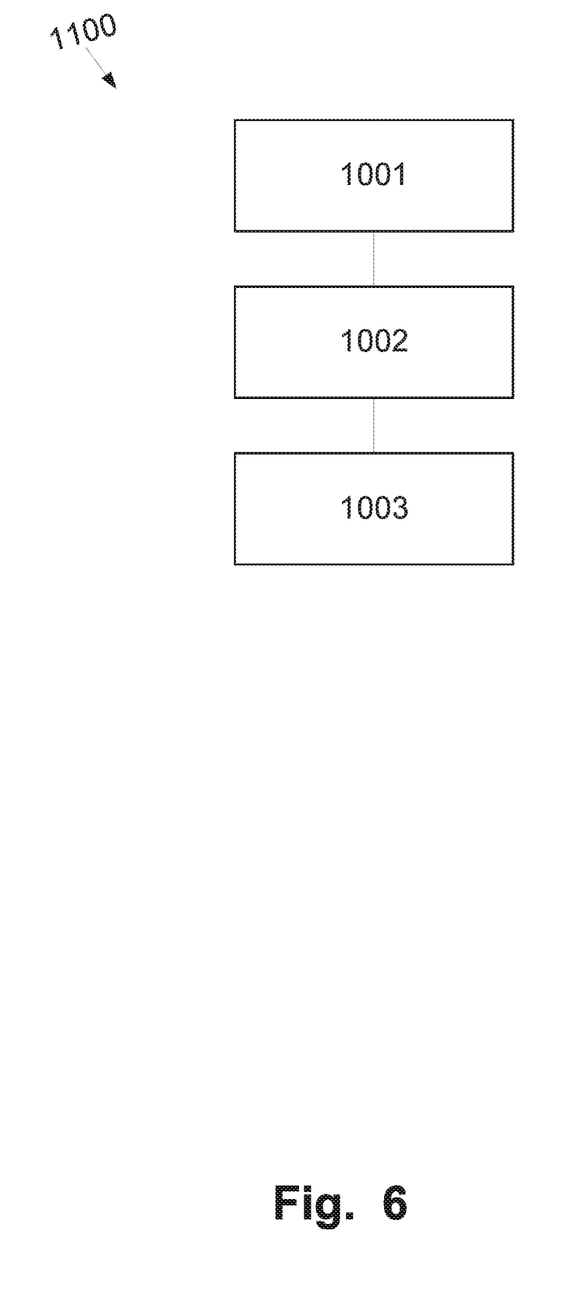
FIG. 6 is illustrating a method for measuring leaked gas from a closed container.

FIG. 6 is illustrating a method 1100 of determining integrity of a closed container. The closed container includes at least one species of a gas. The at least one species of a gas to be detected is either not present in the ambient atmosphere outside the container or is present in a higher concentration inside the container. The method comprises the step of:

Transmitting 1001 a light signal across at least a portion of an outside surface of at least one side of a container using an optical sensor. The optical sensor is sensitive to at least one species of a gas inside the container.

Detecting 1002 a transmitted light signal.

Determining 1003 based on the detected light signal if the at least one species of a gas inside the container has been detected outside of the container.

A container may be a closed bag or closed tray that includes at least one species of a gas, Examples may be containers having a modified atmosphere (MAP). Modified atmosphere is commonly used in packages in order to improve the shelf life, for example in food packages, drugs, etc. gases commonly used are carbon dioxide ($CO_2$) or nitrogen ($N_2$) to lower the amount of oxygen ($O_2$). This is made in order to slow down growth of aerobic organisms and prevent oxidation reactions. Hence it is important to monitor these packages and make sure that there is no leakage, for example during packaging. Apart from $CO_2$, $N_2$, other gases can be monitored as well, depending on the container and the product, for example oxygen ($O_2$) may be of interest for certain products.

The method 1100 may be performed on a single container or may be performed in-line, such as at a convey belt.

In some examples of the method, the optical sensor is a light source and a detector and the light is transmitted between the light source and the detector. The detected light signal is an absorption signal. An example of a sensor may be, for example Tunable diode laser absorption spectroscopy (TDLAS).

Alternatively, in some examples, the optical sensor may be based on laser induced fluorescence (LIF). The detected light signal may be a disperse spectra or excitation spectra. The LIF sensor may using Planar laser-induced fluorescence.

Figure 7:
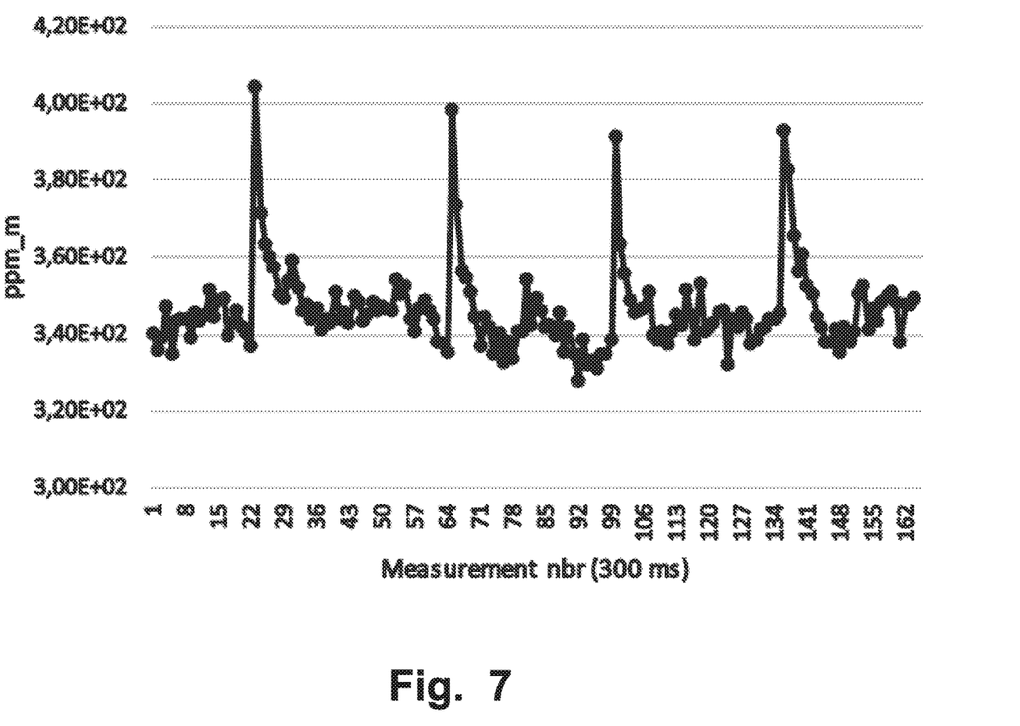
FIG. 7 is illustrating measurements made using the technology described herein.

To improve the sensitivity a force may be applied on a side of the container. The force may be applied using a mechanical member, such as a roller or glider. FIG. 7 shows the result of an example measurement of four leaking tray packages passing through a system based on detection of $CO_2$. The packages have an increased level of $CO_2$ in the headspace and are slightly pressed with a roller creating a small force on the top film of the trays. As the leaking packages pass through the system, the detector records sharp peaks with increased level of $CO_2$ outside the package, in this specific example measured in the unit ppm m (parts-per-million meter $CO_2$). Each measurement point represents the average $CO_2$ signal within a time period of 300 ms.

It should be noted that in the examples described above, it is not necessary to measure the gas concentration in absolute values. In some examples, it is sufficient to measure a signal that is related to the gas concentration. In some examples, the spectroscopic signal is related to the gas pressure.

In some examples, at least one reference container is used, the reference container having no leaks, or having leaks with known characteristics. The measurement on the reference container provides a baseline signal which is used for comparison with the measured signals on subsequent containers.

The present invention has been described above with reference to specific examples. However, other examples than the above described are equally possible within the scope of the disclosure. Different method steps than those described above, performing the method by hardware or software, may be provided within the scope of the invention. The different features and steps of the invention may be combined in other combinations than those described. The scope of the disclosure is only limited by the appended patent claims.

The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

The invention claimed is:

1. A method of determining integrity of a closed container comprising at least one gas, said method comprising:
applying a mechanical force to at least one side of said container, forcing said at least one gas inside said container to leak out by at least partially deforming said container by said mechanical force;

emitting a light signal using an optical sensor, and wherein said light signal is transmitted across at least a portion of an outside surface of at least one side of said container and through said at least one gas leaked out from said container; said optical sensor being sensitive to said at least one gas inside said container;

detecting a transmitted light signal related to said emitted light signal;

determining, based on said transmitted light signal being detected, when a level of said at least one gas inside said container has changed outside of said container.

2. The method according to claim 1, wherein said optical sensor comprises a light source and a detector and said light signal is transmitted between said light source and said detector, and wherein said detected light signal is an absorption signal.

3. The method according to claim 2, wherein said absorption signal is a Tunable diode laser absorption spectroscopy signal.

4. The method of claim 1, wherein said force is applied using a deformation member comprising a roller or a glider.

5. The method of claim 1, wherein said container is a modified atmosphere food package.

6. The method of claim 1, comprising determining an integrity of said container in-line.

7. The method of claim 1, comprising flushing a surrounding of said container with a neutral gas between or during transmittal of said light signal.

8. The method of claim 1, where the at least one gas inside said container is carbon dioxide ($CO_2$).

9. The method of claim 1, comprising, injecting a second gas to create a flow around said package for transporting said at least one gas inside said container to said light signal.

10. The method of claim 1, comprising determining an integrity of said container in-line at a convey belt.

11. A system for determining integrity of a sealed container comprising at least one gas, said system comprising:

a deformation member for applying a mechanical force to at least one side of said container to force said at least one gas inside said container to leak out by at least partially deforming said container by said mechanical force;

an optical sensor sensitive to said at least one gas, and said sensor is configured for emitting a light signal and wherein said optical sensor is configured for transmitting said light signal across at least a portion of an outside surface of at least one side of said container, and said sensor is further configured for detecting a transmitted light signal related to said light signal;

a control unit for determining, based on a detected transmitted light signal, when a level of said at least one gas inside said container has changed outside of said container.

12. The system of claim 11, wherein said sensor comprises a light source and a detector, and wherein said sensor is configured for transmitting said light signal between said light source and said detector, and said detected transmitted light signal is an absorption signal.

13. The system of claim 11, wherein said deformation member is a roller or a glider.

14. The system of claim 11, wherein an extractor or a suction member is arranged close to said sensor for increasing a concentration of said at least one gas adjacent said optical sensor.

15. The system of claim 11, wherein a roof is arranged over said sensor for increasing a concentration of said at least one gas adjacent said optical sensor.

16. The system of claim 15, wherein more than one sensor is arranged at different sides of said container; or wherein said light signal is folded using optics to pass multiple times across a surface of said container; or wherein said light signal is folded using optics to pass over more than one surface of said container.

17. The system of claim 16, wherein the optics are mirrors.

18. The system of claim 11, where said at least one gas is carbon dioxide ($CO_2$).

19. The system of claim 11, where a device is configured for injecting a second gas in order to create a flow around said package for transporting said at least one gas to said light signal.

20. The system of claim 11, comprising holes connected to a pump or a fan is arranged close to said sensor for increasing a concentration of said at least one gas adjacent said optical sensor.

* * * * *